United States Patent [19]

Wuthrich

[11] Patent Number: 4,725,749

[45] Date of Patent: Feb. 16, 1988

[54] STEPPING MOTOR AND FRAME PLATE ASSEMBLY FOR A WRISTWATCH MOVEMENT

[75] Inventor: Paul Wuthrich, Watertown, Conn.

[73] Assignee: Timex Corporation, Middlebury, Conn.

[21] Appl. No.: 945,268

[22] Filed: Dec. 22, 1986

Related U.S. Application Data

[63] Continuation-in-part of Ser. No. 843,020, Mar. 24, 1986, abandoned.

[51] Int. Cl.⁴ .................................... H02K 37/00
[52] U.S. Cl. ........................... 310/49 R; 310/43; 310/91; 310/156
[58] Field of Search ............ 310/40 MM, 49 R, 162, 310/89, 83, 90, 156, 91, 43, 218, 42, 261, 254, 163, 164, 165; 368/155, 156, 157, 162, 160, 163

[56] References Cited

U.S. PATENT DOCUMENTS

| | | | |
|---|---|---|---|
| 2,909,685 | 10/1959 | Szabo | 310/42 |
| 3,902,312 | 9/1975 | Yamazaki | 368/156 |
| 3,949,251 | 4/1976 | Takatsuki | 310/49 R |
| 3,978,651 | 9/1976 | Yoshino | 310/40 MM |
| 3,979,642 | 7/1976 | Yoshino | 310/49 R |
| 4,270,066 | 5/1981 | Terade | 310/40 MM |
| 4,317,187 | 2/1982 | Yamazaki | 368/156 |
| 4,369,385 | 1/1983 | Malkin | 310/40 MM |
| 4,376,996 | 3/1983 | Wutrich | 368/220 |
| 4,392,748 | 7/1983 | Yoshino | 368/157 |
| 4,426,158 | 1/1984 | Muller | 368/157 |
| 4,523,857 | 6/1985 | Ushikoshi | 368/107 |
| 4,647,218 | 3/1987 | Wuthrich | 368/157 |
| 4,679,944 | 7/1987 | Sedlak | 310/49 R |

FOREIGN PATENT DOCUMENTS 8521736 11/1985 Fed. Rep. of Germany .

*Primary Examiner*—R. Skudy
*Attorney, Agent, or Firm*—William C. Crutcher

[57] ABSTRACT

A wristwatch movement has a Lavet stepping motor directly driving a center wheel attached to the minute hand. The frame plate of the movement is of non-magnetic plastic material with recesses locating the pole shoes of two stator members of the stepping motor. An integral plastic cylindrical wall extends from the recess. The stepping motor rotor is rotatably supported within the wall by a journal at one end in the frame plate and at the other end by a cap. The stator pole faces are accurately spaced from the rotor by the wall and held in place by deforming plastic material against the stator pieces toward the wall.

11 Claims, 9 Drawing Figures

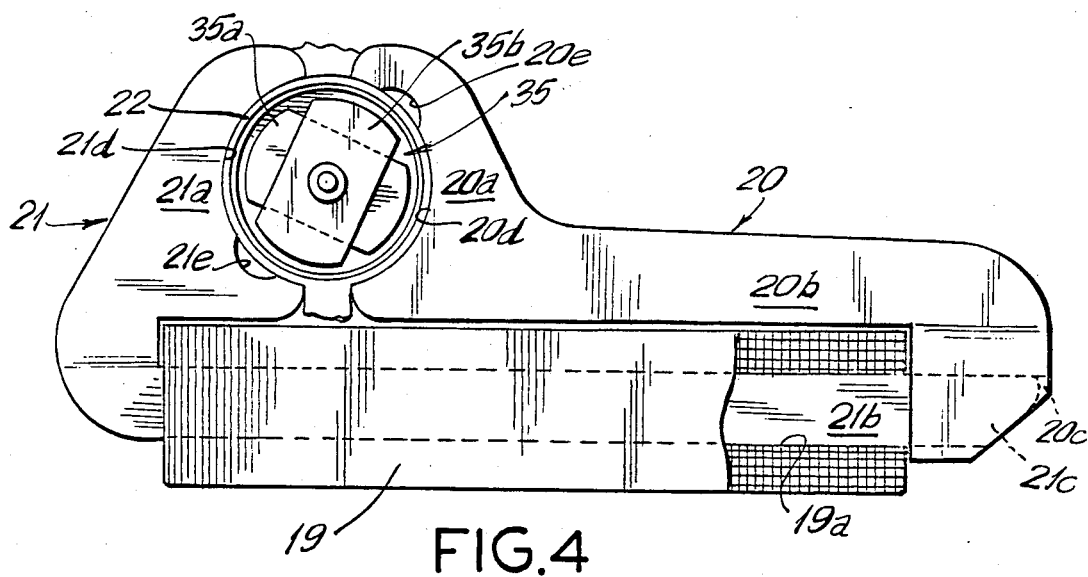
FIG.4
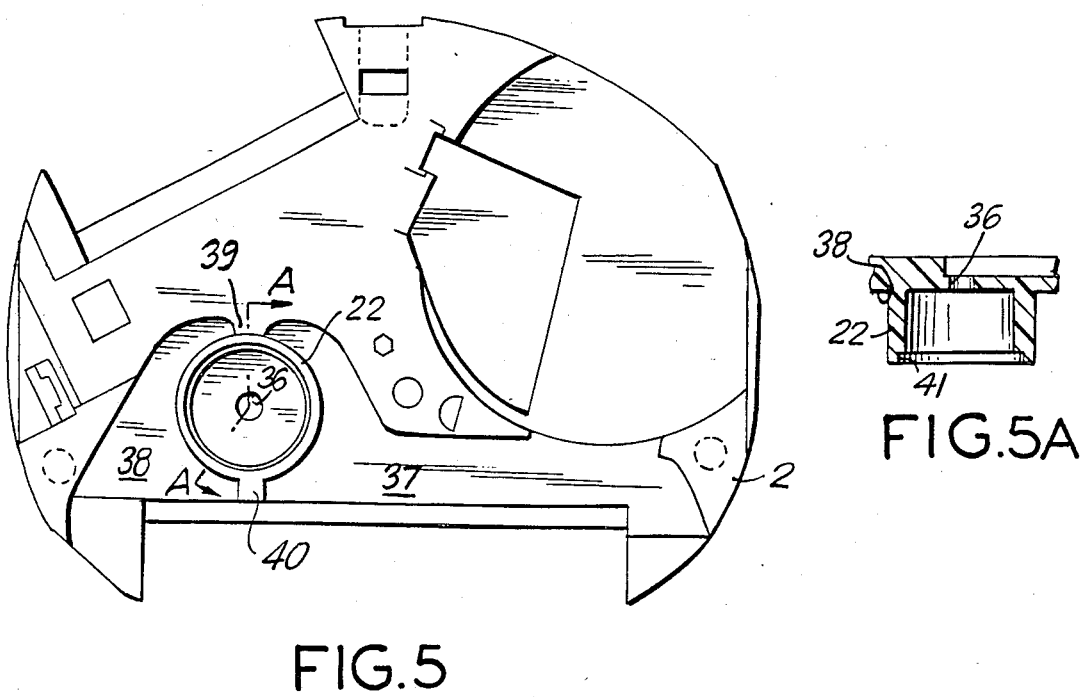
FIG.5
FIG.5A

STEPPING MOTOR AND FRAME PLATE ASSEMBLY FOR A WRISTWATCH MOVEMENT

BACKGROUND OF THE INVENTION

This is a continuation-in-part of applicant's pending application Ser. No. 843,020, now abandoned, filed Mar. 24, 1986 having the same title.

This invention relates generally to wristwatch movements incorporating stepping motors of the Lavet type, which drive the hands of the wristwatch through a gear train. The motor is of the type which receives periodic stepping pulses from a quartz-synchronized integrated circuit. More particularly, the invention relates to the assembly and retention of the stator members of the stepping motor with respect to the frame plate supporting the various parts of the movement, such as the gear members and electrical components.

Wristwatch movements are known which drive a center wheel directly connected to the minute hand by means of a stepping motor rotor acting at the periphery of a wheel connected to the minute hand shaft. By this means, a single reduction gear member can perform the proper reduction to drive an hour hand shaft coaxial with the minute hand shaft. Such an arrangement is shown in U.S. Pat. No. 4,376,996 issued Mar. 15, 1983, in the name of the present inventor and assigned to the present assignee. In a copending application Ser. No. 06/776,285 filed Sept. 16, 1985, now U.S. Pat. No. 4,647,218 issued Mar. 3, 1987, also in the name of the present inventor and assigned to the present assignee, a timepiece stepping motor of the Lavet-type includes a rotor with a pair of driving pins stepping the rotor 180 degrees once each minute. The pins drive a toothed wheel directly at its periphery which is also connected to the minute hand, so as to step the minute hand once each minute. In this patent, the Lavet stator is a one piece stator member with a central opening into which is inserted a box of nonmagnetic material housing the rotor of the stepping motor. Another example of a one piece stator member is shown in U.S. Pat. No. 4,270,066 issued May 26, 1981 to Terade et al. In this patent, a reinforcing ring is employed to add additional stiffness to the one piece stator because of the thin edges around the stator hole which are necessary to the performance of the motor. A one piece stator was employed because of difficulties in adjusting proper positions of the pole shoes when two separate stator pieces were employed.

Another construction using a one piece stator member has been proposed to employ a semi-cylindrical wall of plastic material extending from a plastic frame plate in between the rotor and the central stator hole in the air gap. This proposed construction is shown in U.S. application Ser. No. 863,751 assigned to the present assignee, filed on May 16, 1986 now U.S. Pat. No. 4,679,944 issued July 14, 1987.

Another one piece stator construction employs one stator member of U-shaped configuration with an integral core member extending through the length of the coil. The other end of the stator member is connected to the extending core member by a bridging member to complete a magnetic circuit. This construction is shown in abandoned U.S. application Ser. No. 863,752 filed May 16, 1986, and assigned to the present assignee.

It is known in the prior art to utilize two separate stator pieces rather than a one piece stator. Each stator piece has a shoe surrounding a portion of the rotor periphery, and is connected to core pieces extending into the stepping motor coil. One such construction is shown in U.S. Pat. No. 2,909,685 issued Oct. 20, 1959, to H. Szabo, who adjusts the core pieces using a temporary spacer between rotor and pole shoes during assembly.

Because of the difficulty in precisely adjusting two separate pole shoes with respect to the rotor in a Lavet stepping motor, it has been proposed to adjust the relative positions of the stator yokes with eccentric pins or, as an improvement thereof, to weld or otherwise mount two stator yokes to a nonmagnetic reference plate which, in turn, is mounted to a watch plate. The reference plate is located on the frame plate by guide openings cooperating with the frame plate on which the assembly is mounted. Such constructions are shown in U.S. Pat. Nos. 3,978,651 issued Sept. 7, 1976, and in 3,969,642 issued July 13, 1978, both to Yoshino.

U.S. Pat. No. 4,369,385 issued Jan. 18, 1983 to Malkin et al. proposes a stepping motor with two piece stator, having an eccentric ferromagnetic ring attached to a nonferrous sleeve for stopping the rotor at preselected angular positions. The two stator pieces may be adjusted with respect to the sleeve. However, there is no means for positioning the stator with respect to the rotor.

U.S. Pat. No. 3,949,251 issued Apr. 6, 1976 to Takatsuki discloses a bearing ring supporting one end of the rotor fixed in an opening in the base plate and having a flange extending above the base plate. Diametrically opposed tips of the pole shoes are pivoted to contact the flange and determine rotor stop positions. Adjustment of eccentric pins passing through slots in the stator pieces serves to maximize efficiency. Close tolerances of a number of components and adjustment of the stator pieces are required with this construction.

All of the foregoing constructions, requiring one piece stators, or two piece stators with eccentric adjusting pins, or reference mounting plates, add to the cost of the wristwatch movement.

Accordingly, one object of the present invention is to provide an improved stepping motor and frame plate assembly for a wristwatch.

Another object of the invention is to provide an improved two piece stator assembly for a Lavet motor in a wristwatch.

Another object of the invention is to provide an improved frame plate construction for mounting and accurately positioning the stator members of a stepping motor.

DRAWINGS

The invention, both as to organization and method of practice, together with other objects and advantages thereof, will be best understood by reference to the following description, taken in connection with the accompanying drawings in which:

FIG. 1 is a top plan view of a wristwatch movement without the hands, dial, or watchcase, FIG. 2 is a bottom plan view of the wristwatch movement, FIG. 3 is a exploded perspective view of the wristwatch movement including also the hands and dial, FIG. 4 is an enlarged plan view of the stepping motor, FIG. 5 is a bottom plan view of the frame plate of the movement in its unassembled state, FIG. 5A is a cross-section through the frame plate of FIG. 5 taken along lines A—A, FIG. 6 is an enlarged developed elevation view taken through portion of the movement frame and stepping motor, and FIGS. 7 and 8 are enlarged partial plan views of modified forms of the invention.

SUMMARY OF THE INVENTION

Briefly stated, the invention comprises an improvement in a movement for a wristwatch of the type having a Lavet stepping motor with a coil receiving periodic drive pulses from a driving circuit to periodically step a rotor connected to drive the hour and minute hands for displaying the time. The improvement comprises a first stator member for the stepping motor with a pole shoe and a connected core member fitting inside the coil, a second stator member with a pole shoe having a stator portion extending outside the coil and connected in magnetic circuit with the core member, a frame movement plate of nonmagnetic material having a recess with portions adapted to receive and locate the pole shoes and having a journal for receiving a stepping motor rotor, the frame also defining substantially cylindrical wall portions extending from the recess and serving to accurately space arcuate pole shoe faces with respect to each other and the rotor axis. Preferably the nonmagnetic material is of heat deformable plastic, which may be deformed to hold the stator members in place and position them against the cylindrical wall to be substantially contiguous therewith. The wall extends through the air gap and supports a nonmagnetic cap having a journal for supporting the other end of the rotor.

DESCRIPTION OF THE PREFERRED EMBODIMENT

Figure 1:
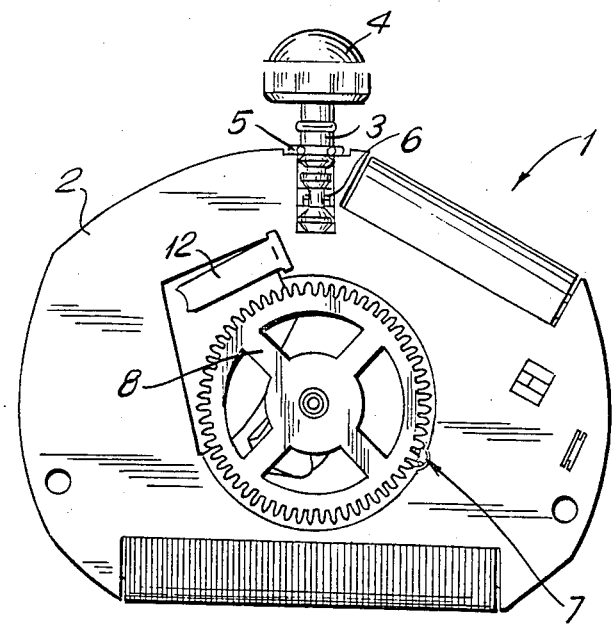

Referring now to FIG. 1 of the drawing, the wristwatch movement shown generally as 1 includes a nonmagnetic frame plate, 2 preferably of plastic material, such as polycarbonate which may be precisely molded to define the various recesses and journals serving as bearings for the gear members, as well as being locally deformable upon application of heat to secure components to the frame plate. A stem 3 is manually actuatable by crown 4 with respect to a detent spring 5 to actuate electrical switch plate contacts, such as 6, to control the operation and setting of the wristwatch. As shown generally at reference number 7, a stepping motor rotor having two drive pins cooperating with 60 external teeth on a center wheel 8 is periodically stepped or rotated 180 degrees once per minute.

Figure 2:
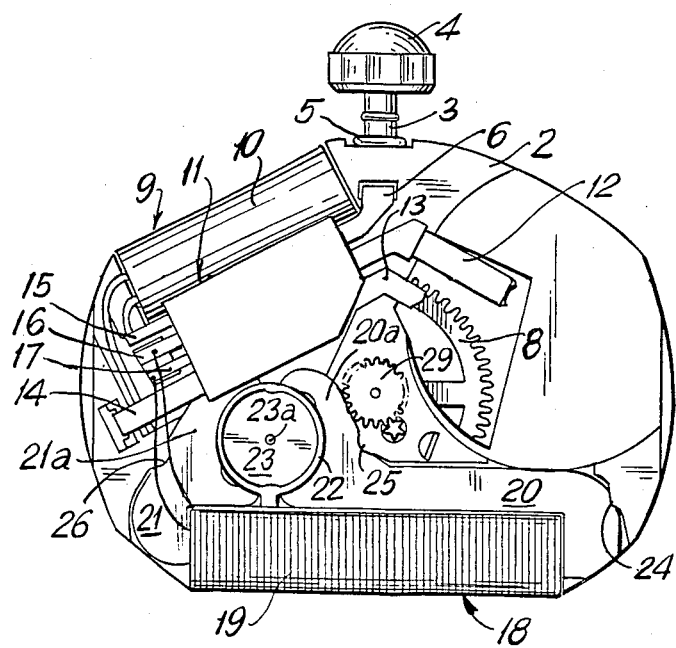

Referring to FIG. 2 of the drawing, the driving pulses are provided by a drive circuit assembly shown generally as 9, comprising a quartz crystal 10, and a integrated circuit (not shown) encapsulated within a monolithic plastic housing 11. The integrated circuit is connected to a lead frame having various conductive extensions such as battery terminals 12 and 13, quartz crystal attachment leads 14, 15 and coil connection leads 16, 17.

The stepping motor, shown generally as 18 comprises a coil 19 with leads connected to terminal 16, 17 of the drive circuit assembly. A first stator member 20 has a first pole shoe 20a and a second stator member 21 has a second pole shoe 21a. The pole shoes are positioned on either side of and abut a cylindrical wall member 22 of nonmagnetic material which is preferably integral with the frame plate 2. The cylindrical wall member 22 holds a cap 23 of nonmagnetic material such as brass with a journal 23a for one end of the stepping motor rotor. The first and second stator members 20, 21 are disposed in a recess defined in the frame plate which locates them in place. The frame plate is deformed by heat during assembly at locations such as 24, 25, and 26 to hold the stator members 20, 21 in place as well as to force them to abut the cylindrical wall member 22.

Figure 3:
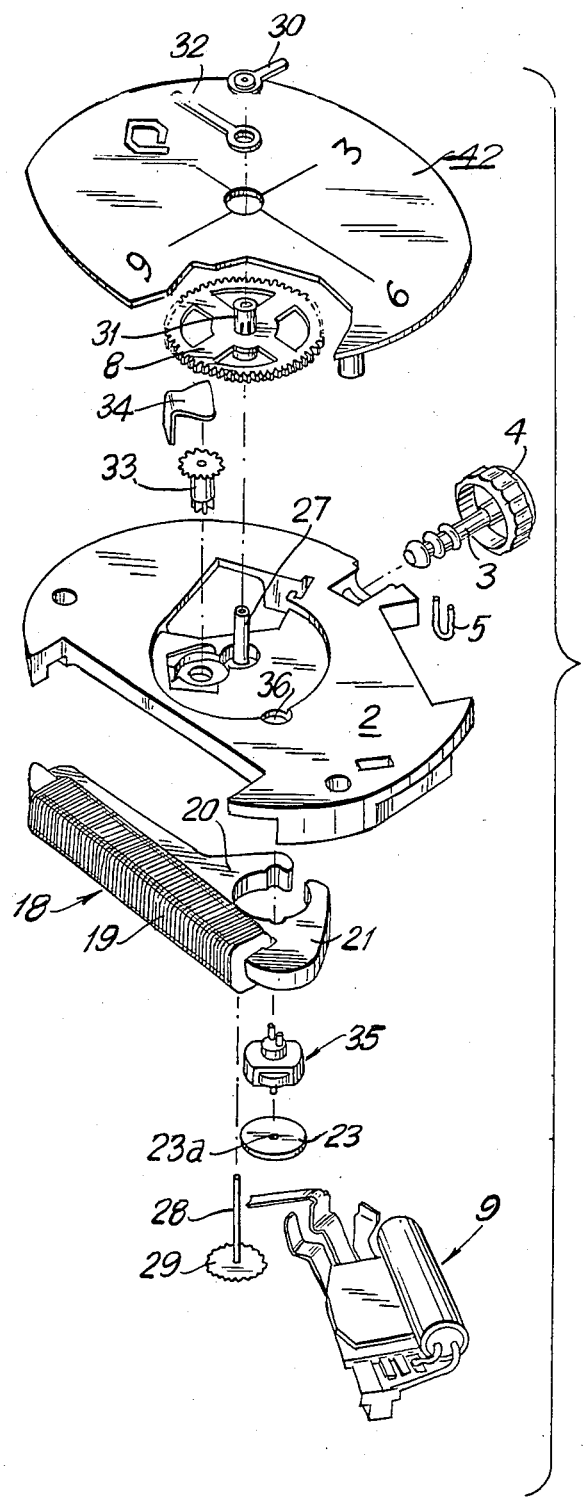

Referring now to FIG. 3 of the drawing, the exploded view shows parts having the reference numbers previously mentioned, as well as the following additional members, as follows. The frame plate 2 has fixed therein a metal center post 27 which internally journals an hour wheel shaft 28 with an hour wheel 29 fixed to its lower end. Shaft 28 is adapted to receive the hour hand 30 fixed to its upper end above a dial 42. The center post also serves to externally journal a center wheel pinion member 31 which is attached to center wheel 8 and adapted to receive a minute hand 32 on its upper end. Speed reduction between the minute hand and hour hand is provided by a reduction gear and pinion member 33 which is journaled in frame plate 2, and held in place by a metal plate 34. It remains to note that the stepping motor rotor, indicated by reference 35 is journaled at one end in a hole 36 molded in the frame plate 2 coaxial with cylindrical wall member 22, and journaled at its other end in the aforementioned hole 23a in the cap 23.

Referring now to FIG. 4 of the drawing, the stepping motor will be described in more detail. The first stator member 20 includes a first stator portion 20b extending outside of the coil and terminating in an offset portion 20c at one end of coil 19. The second stator member 21 has connected to its pole shoe 21a an extending longitudinal core member 21b which passes through an opening 19a in the center of the coil. Core member 21b extends beyond the coil to terminate in a core portion 21c overlapping offset portion 20c so as to be in magnetic circuit therewith.

The pole shoes 20a and 21a define arcuate pole face portions 20d and 21d respectively, which are coaxial with respect to the rotor axis. The pole face portions, in turn, define opposed recess notches 20e, 21e respectively which serve to determine the rest position of rotor 35 in a manner known in the art. Rotor 35 comprises a permanent magnet portion 35a with a plastic overmolding portion 35b. The axis of rotor 35 is accurately positioned with respect to cylindrical wall 22 by means of journal hole 36 molded in frame plate 2 and journal 23a in the cap 23 (see FIG. 3). The arcuate pole face portions 20d, 21d are, in turn, accurately located with respect to the cylindrical wall member 22, by abutting its outer surface, so that the arcuate pole faces are substantially contiguous with the arcuate outer surface of the cylindrical wall.

Referring now to FIG. 5 of the drawing, frame 2 is a plastic molding which defines recess means for locating the stator of the stepping motor, comprising a first recess 37 shaped to receive the first stator member with close clearances and second recess 38 similarly shaped to receive the second stator member with close clearances. Although recesses 37, 38 could be part of a single large recess, they are separated in the present embodiment by wall portions 39, 40 which join with the cylindrical wall member 22 rising from the floor of the recess.

Referring now to the cross-section of FIG. 5A, the cylindrical wall member is centered about an axis through journal 36 and includes a notched recess 41 to receive the cap 23, thereby accurately locating it also with respect to the frame.

Figure 6:
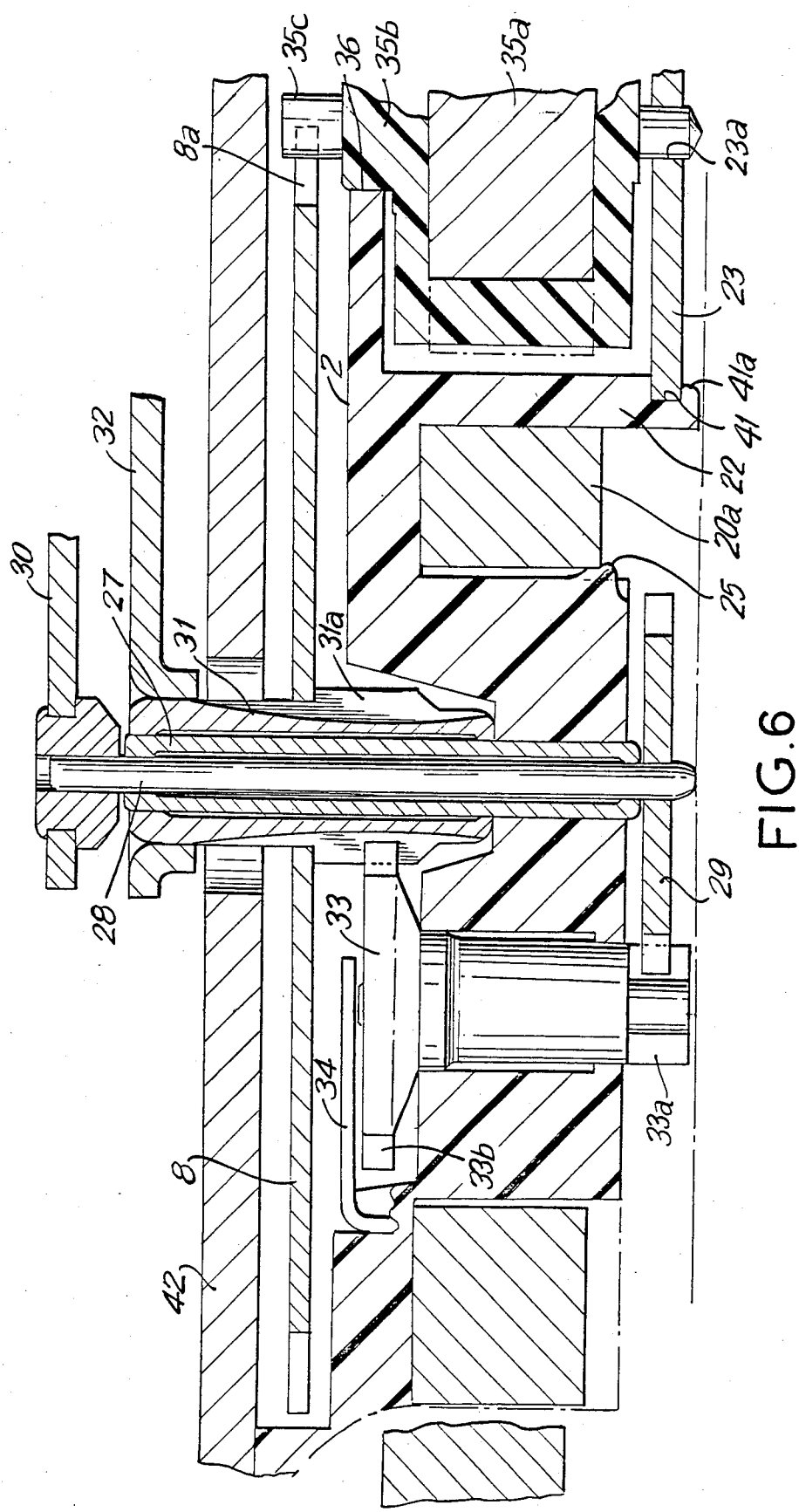

Referring now to FIG. 6 of the drawing, the cross-section illustrates that the center post 27 internally journals the hour wheel shaft 28 with the hour wheel 29 attached at its lower end and the hour hand 30 at its upper end. The hour wheel meshes with pinion teeth 33a of the reduction gear and pinion assembly 33, which is journaled in the frame 2. Gear teeth 33b of the pinion mesh with pinion teeth 31a on the center wheel pinion member 31 which is also attached to center wheel 8. The center wheel has 60 outer teeth 8a which are engaged by the two pins on the rotor pinion, one of which is shown at 35c. Pulses received by the stepping motor once each minute step the center wheel and minute hand. The hour hand is also stepped through the reduction gearing comprising center wheel pinion member 31, reduction gear and pinion 33, and hour wheel 29.

The rotor 35 is journaled at its upper end by an extension on plastic overmolding 35b rotatably disposed in the hole 36 in the nonmagnetic frame member. Cap 23 is held within the recess 41 coaxially with respect to cylindrical wall 22 by deforming the upper edge of the wall as indicated at 41a. In this manner, rotor 35 is precisely positioned with respect to cylindrical walls 22. The pole shoes of the stator, such as 20a indicated in FIG. 6 are forced toward the cylindrical wall 22 by deforming the frame member 2 at selected places, as indicated at 25. In this manner, the arcuate pole face portions of the pole shoes are precisely spaced with respect to the axis of the stepping motor rotor. The stator members are held in place without need for any other screws, posts, or adjusting members by a simple operation which takes place at the time of assembly.

MODIFICATIONS

The movement shown in FIGS. 1–6 provides for a two piece stator in which the arcuate pole face portions of the respective pole shoes are coaxial with respect to the rotor axis. In this case known means such as notches 20e, 21e are used for arresting and fixing the angular position of the rotor between driving pulses. A modified form of the invention uses another known means of arresting and fixing the angular position of the rotor between driving pulses by offsetting or shifting the centers of the arcuate pole face portions with respect to the rotor axis. This method is used in the previously cited U.S. Pat. Nos. 3,978,651 and 3,969,642 to Yoshino, and consists of a eccentric offset of the pole shoes with respect to the rotor axis so that the pole shoes establish an assymetrical flux gap, wich serves to arrest the rotor in a preselected angular position after each driving pulse.

Figure 7:
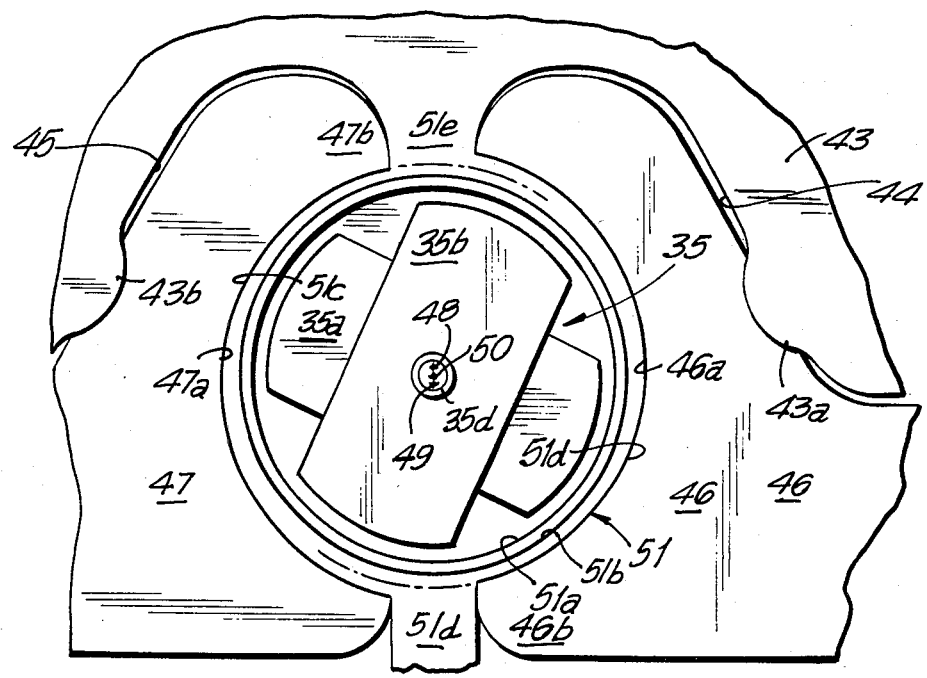

Referring to FIG. 7 of the drawing, a frame plate 43 of nonmagnetic material defines a first recess 44 and a second recess 45 receiving first and second pole shoes 46, 47 respectively. The pole shoes define smooth arcuate pole face portions 46a, 47a, with no notches, which are formed by radii from centers 48, 49 respectively.

The rotor 35 is constructed as previously described with a plastic overmolding 35b surrounding a permanent magnet 35a. Rotor 35 is a rotatably supported as before on journals provided by the plastic overmolding. One rotor journal is supported in a hole (not shown) in frame 43. The other rotor journal indicated at 35d is supported in a cap 23 (see FIG. 6) as before. The rotor axis of rotation is indicated at 50 midway between pole face centers 48, 49.

A substantially cylindrical wall member 51 which is integral with frame 43 extends upwardly from the frame plate and serves to accurately space the pole shoes 46, 47 from each other and to locate them with respect to the rotor axis 50. Cylindrical wall member 51 has an inner cylindrical surface 51a with a recess 51b for receiving cap 23, formed about axis 50 and coaxial with the rotor 35. Semicylindrical outer surfaces 51c, 51d are formed on centers 48, 49 respectively. Cylindrical wall member 51 further includes pole shoe separators 51d, 51e, which are also integral with wall 51 and frame 43. By the foregoing arrangement, one terminating end 47b of pole shoe 47 and a diametrically opposed terminating end 46b of pole shoe 46 are disposed closer to rotor axis 50 than are other parts of the magnetic circuit surrounding the air gap.

As in the previously described embodiment, the frame 43 includes means retaining the pole shoes 46, 47 in the recess 44, 45 and causing them to abut the outer wall portions 51b, 51c, so that the arcuate pole face portions are substantially contiguous with the wall outer surface. Such means include deformed wall portions 43a, 43b. These are shown as overlapping the pole shoes in the plan view of FIG. 7 and if shown as an elevation view, would appear the same as indicated by deformed wall portion 25 in FIG. 6.

Figure 8:
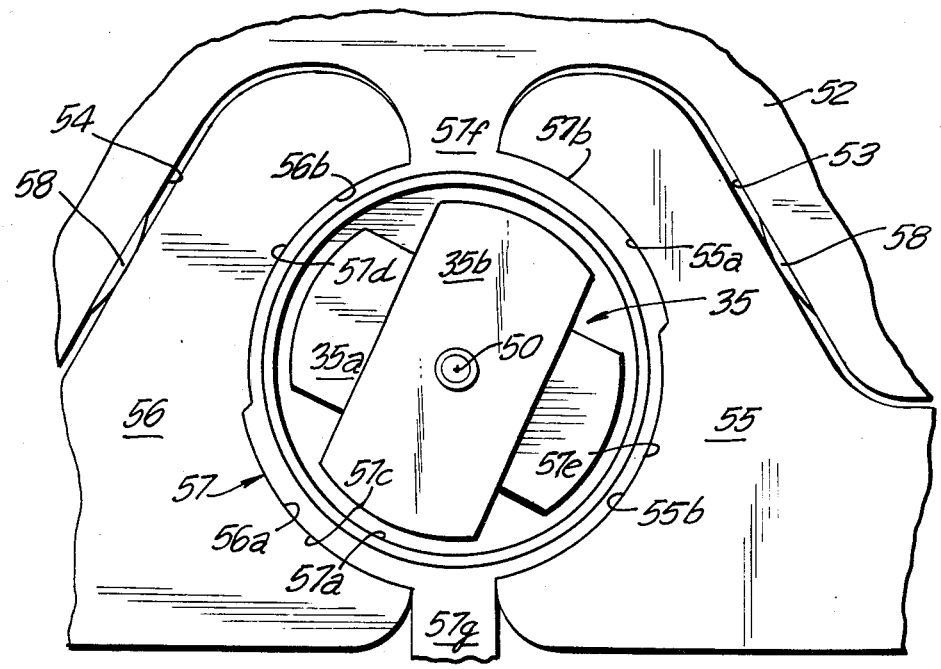

FIG. 8 illustrates another modified form of the invention using another known means of arresting and fixing the angular position of the rotor between driving pulses by employing two different radii over different parts of the pole shoe. This method is used in the previously cited U.S. Pat. No. 2,909,685 to Szabo.

Referring to FIG. 8 of the drawing a frame plate 52 of nonmagnetic material defines a first recess 53 and a second recess 54 receiving first and second pole shoes 55, 56 respectively. A rotor 35 having permanent magnet 35a and plastic overmolding 35b is rotatably mounted on axis 50 as previously described in connection with FIG. 7. Pole shoe 55 defines an arcuate pole face portion 55a at a greater radius from axis 50 and arcuate pole face portion 55b at a lesser radius. Similarly, pole shoe 56 defines arcuate pole face portions 56a, 56b at greater and lesser radii respectively.

A substantially cylindrical wall member 57, which is integral with frame plate 52 extends upwardly and serves to accurately space the pole shoes 55, 56 from each other and locate them coaxially with respect to the rotor axis 50. Wall member 57 includes an inner cylindrical surface 57a and outer arcuate cylindrical surfaces 57b, 57c of greater equal radius, 57d, 57e of lesser equal radius and separating wall sections 57f, 57g which are integral with the frame. The arrangement is such that arcuate pole face portions 55b, 56b form a region of reduced air gap and serve to fix the rest position of rotor 35 because they are closer to the rotor axis than are the arcuate pole face portions 55a, 56a. Means for retaining the pole shoes 55, 56 in recess 53, 54 and causing them to abut and to be substantially contiguous with outer wall portions 57b, 57c, 57d, 57e are provided by tapered wedging members 58 forced between the walls of the recess and the pole shoes. These wedging members may be retained by adhesive or by friction fit.

The invention provides an improved stepping motor and frame plate assembly without need for intermediate members and at the same time provides the precise positioning of the stator members with respect to rotor which is necessary in a Lavet-type stepping motor.

While there has been described what is considered at present to be the preferred embodiment of the invention, other modifications will occur to those skilled in the art, and it is desired to secure in the appended claims all such modifications as fall within the true spirit, and scope of the invention.

What is claimed is:

1. In a movement for a wristwatch having a stepping motor with a coil connected to a driving circuit providing periodic output driving pulses, said stepping motor connected through a gear train to drive hour and minute hands for displaying the time, the improvement comprising:
   a first stator member for said stepping motor having a first pole shoe defining a first arcuate pole face portion, said first pole shoe having a first stator portion extending outside the coil,
   a second stator member for said stepping motor having a second pole shoe defining a second arcuate pole face portion, said second pole shoe having connected thereto a core member adapted to fit inside said coil and having a portion connected in magnetic circuit with said first stator portion,
   a stepping motor rotor having a permanent magnet disposed between and defining an air gap with said pole shoes, and
   a frame plate of nonmagnetic material defining first and second recess portions adapted to receive and locate said first and second pole shoes within said first and second recess portions, said frame plate including means retaining said first and second pole shoes within said recess portions, said frame plate having a first journal hole for rotatably mounting one end of said stepping motor rotor and having a substantially cylindrical wall member surrounding the first journal hole and extending from the frame plate between said pole shoes, said substantially cylindrical wall member having first and second outer wall portions, said first and second arcuate pole face portions being substantially contiguous with said first and second outer wall portions respectively to space said arcuate pole face portions from one another and to locate said arcuate pole face portions with respect to the rotor axis.

2. The improvement according to claim 1, wherein said frame plate is comprised of plastic material and wherein said retaining means comprises selected portions of said frame plate adjacent said first and second recess portions which are deformed so as to retain the first and second pole shoes in said recess portions and abutting said stator members to cause them to abut respective first and second outer wall portions of said cylindrical wall member.

3. The improvement according to claim 1, wherein said retaining means comprises wedges disposed between said stator members and the walls of said recess portions so as to retain the first and second pole shoes in said recess portions and to cause the pole shoes to abut respective first and second outer wall portions of said cylindrical wall member.

4. The improvement according to claim 1, wherein said first stator portion terminates in an offset portion at one end of said coil, and wherein said core member of said second stator member extends through the length of said coil and defines a core end portion therebeyond overlapping said offset portion.

5. The improvement according to claim 1, wherein said cylindrical wall portion extends through the air gap between the rotor and pole shoes, and including a cap of nonmagnetic material disposed thereon, said cap having a second journal hole rotatably mounting the other end of said stepping motor rotor.

6. The improvement according to claim 5, wherein said cylindrical wall portion is of plastic material and defines a peripheral recess seating said cap, and includes a portion which is deformed upon said cap adjacent said recess to hold the cap in place.

7. The improvement according to claim 1, wherein said arcuate pole face portions are coaxial with respect to said rotor axis.

8. The improvement according claim 1, wherein said arcuate pole face portions are offset with respect to said rotor axis in diametrically opposed directions.

9. The improvement according to claim 1, wherein said acruate pole face portions are arranged at greater and lesser radii with respect to the rotor axis on each of said pole shoes, said lesser radii portions being diametrically opposed.

10. The improvement according to claim 1, wherein said arcuate pole face portions are disposed closer to the rotor axis over part of said air gap and farther from the rotor axis over another part of said air gap and arranged to provide diametrically opposed regions of small air gap for determining the rest position of said rotor.

11. The improvement according to claim 1, wherein said pole shoe arcuate faces define oppositely disposed notches for determining the rest position of said rotor.

* * * * *